United States Patent
Dixon

(10) Patent No.: US 10,877,255 B2
(45) Date of Patent: Dec. 29, 2020

(54) HIGH RESOLUTION PATHOLOGY SCANNER WITH IMPROVED SIGNAL TO NOISE RATIO

(71) Applicant: Huron Technologies International Inc., Waterloo (CA)

(72) Inventor: Arthur Edward Dixon, Waterloo (CA)

(73) Assignee: Huron Technologies International Inc., Waterloo ( * ) Notice: Subject to any disclaimer, the term of this patent is extended or adjusted under 35 U.S.C. 154(b) by 9 days.

(21) Appl. No.: 15/563,913

(22) PCT Filed: Apr. 4, 2016

(86) PCT No.: PCT/CA2016/000100
§ 371 (c)(1),
(2) Date: Oct. 2, 2017

(87) PCT Pub. No.: WO2016/154729
PCT Pub. Date: Oct. 6, 2016

(65) Prior Publication Data
US 2018/0120547 A1  May 3, 2018

Related U.S. Application Data

(60) Provisional application No. 62/142,335, filed on Apr. 2, 2015.

(51) Int. Cl.
*G02B 21/00* (2006.01)
*G02B 21/26* (2006.01)
(Continued)

(52) U.S. Cl.
CPC ............ *G02B 21/008* (2013.01); *G02B 21/26* (2013.01); *G02B 21/36* (2013.01); *G02B 21/364* (2013.01);
(Continued)

(58) Field of Classification Search
CPC ...... G02B 21/008; G02B 21/26; G02B 21/36; G02B 21/364; G02B 21/367;
(Continued)

(56) References Cited

U.S. PATENT DOCUMENTS

2004/0252875 A1 * 12/2004 Crandall ............ G02B 21/002
                                                            382/133
2008/0095467 A1 *  4/2008 Olszak ............... G02B 21/002
                                                            382/284
(Continued)

FOREIGN PATENT DOCUMENTS

WO      WO-2013040686 A1 *  3/2013  ............ G02B 21/002

*Primary Examiner* — Stephone B Allen
*Assistant Examiner* — Adam W Booher
(74) *Attorney, Agent, or Firm* — David Schnurr

(57) ABSTRACT

An instrument for imaging a specimen or a portion of a specimen is configured to capture multiple image frames of the portion of the specimen being scanned using Moving Specimen Image Average (MSIA) to create one or more image strips. The instrument is configured to use an active area of a two dimensional sensor array that covers substantially all of the width of the sensor array but less than a length. The one or more image strips are created from the multiple image frames as each of the multiple image frames is captured.

Preferably, the instrument is configured to remove blurring, caused by distortion of the optics, by software or by warping a grid of the two dimensional detector array, including TDI array.

13 Claims, 15 Drawing Sheets

(51) Int. Cl.
*G02B 21/36* (2006.01)
*H04N 5/357* (2011.01)
*H04N 9/04* (2006.01)
*G02B 5/20* (2006.01)
*G02B 21/24* (2006.01)

(52) U.S. Cl.
CPC ......... *G02B 21/367* (2013.01); *H04N 5/3572* (2013.01); *H04N 9/045* (2013.01); *G02B 5/201* (2013.01); *G02B 21/241* (2013.01)

(58) Field of Classification Search
CPC .................. G02B 21/241; G02B 21/002; G02B 21/0036; G02B 21/004; G02B 21/244; G02B 21/365; G02B 5/201; H04N 5/3572; H04N 5/35721; H04N 9/045; H04N 9/04517; H04N 9/04519; H01L 27/146; H01L 27/14607
See application file for complete search history.

(56) References Cited

U.S. PATENT DOCUMENTS

2012/0098926 A1* 4/2012 Kweon .................. G06T 1/00
348/36
2013/0342674 A1* 12/2013 Dixon ................ G02B 21/0076
348/79

\* cited by examiner

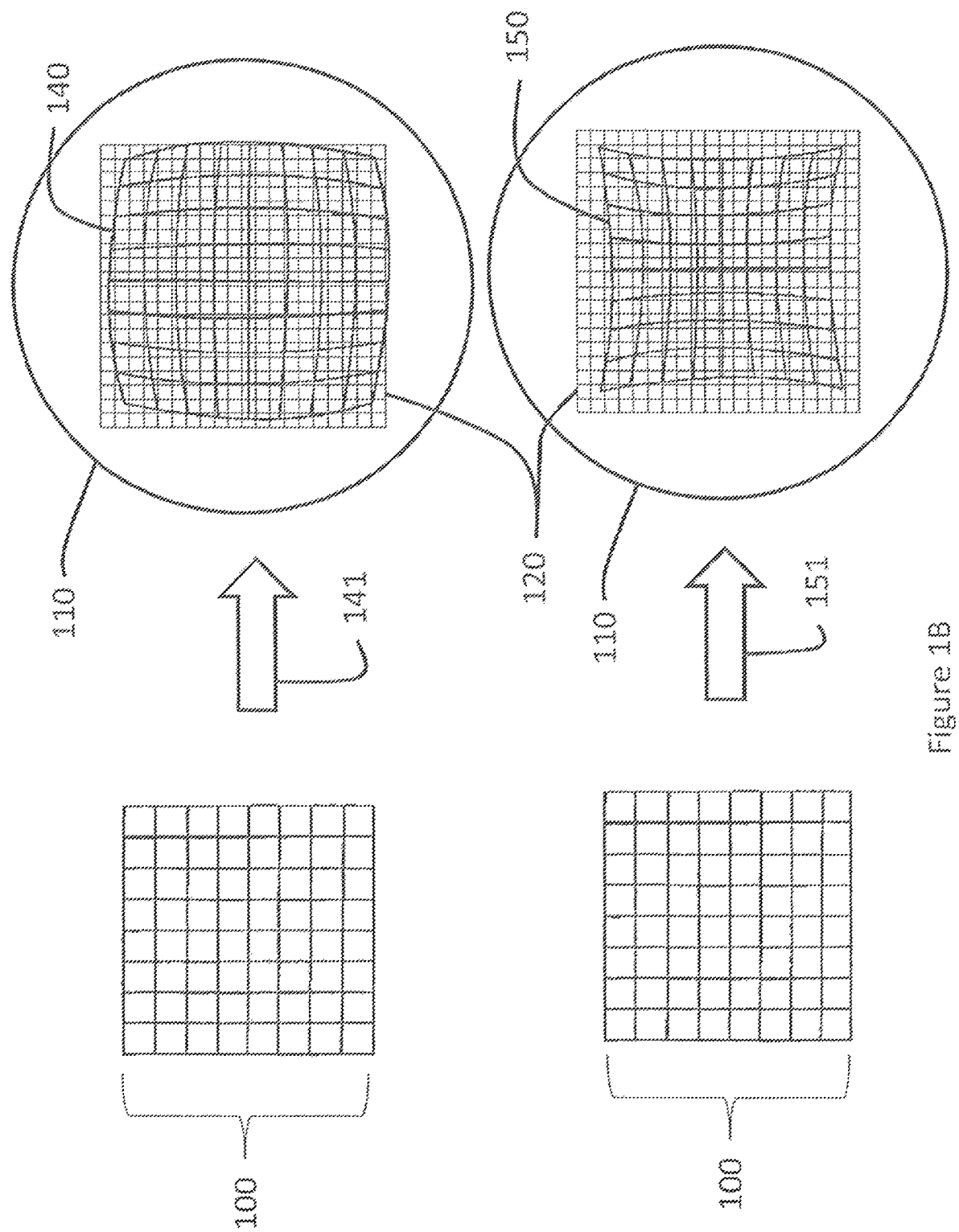

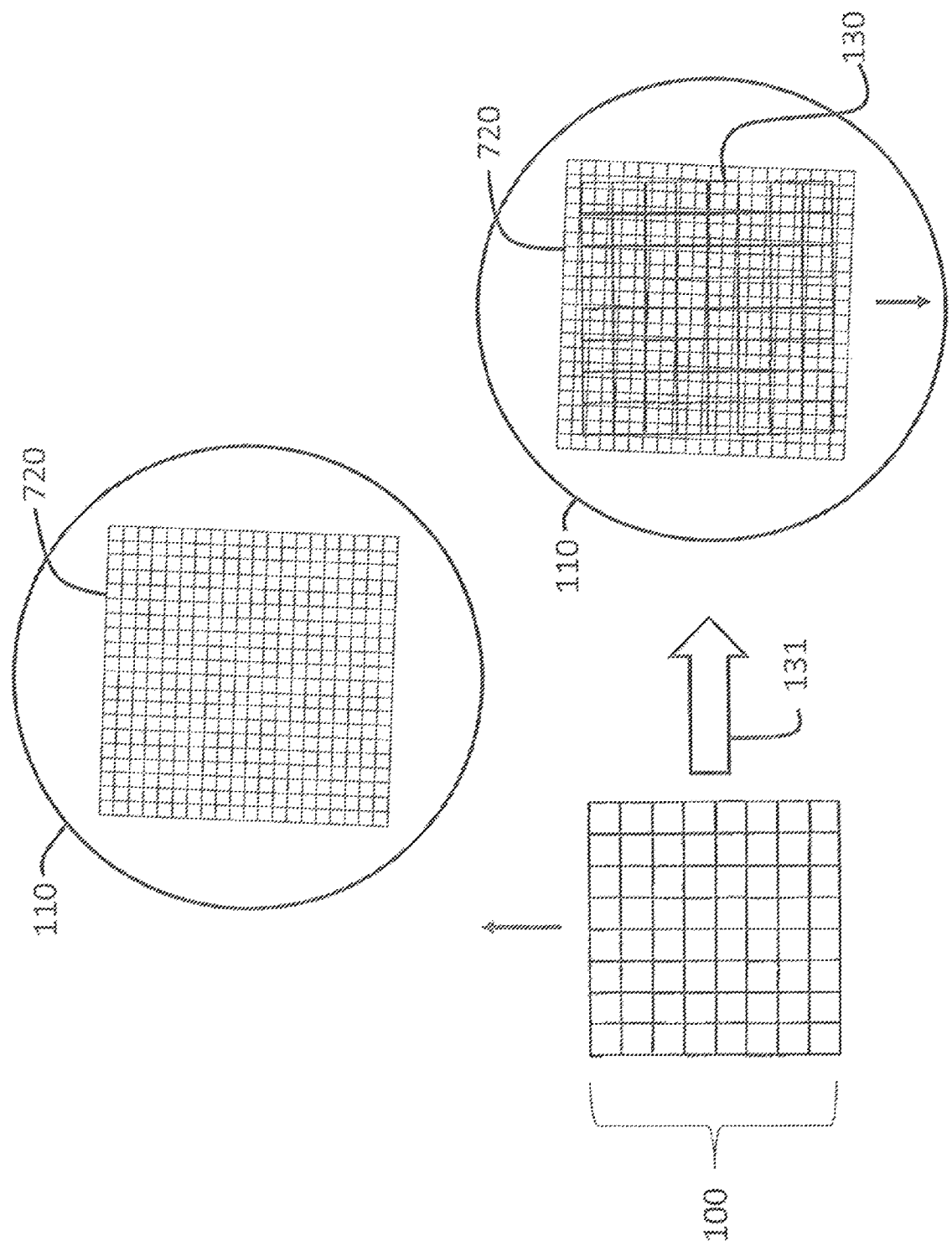

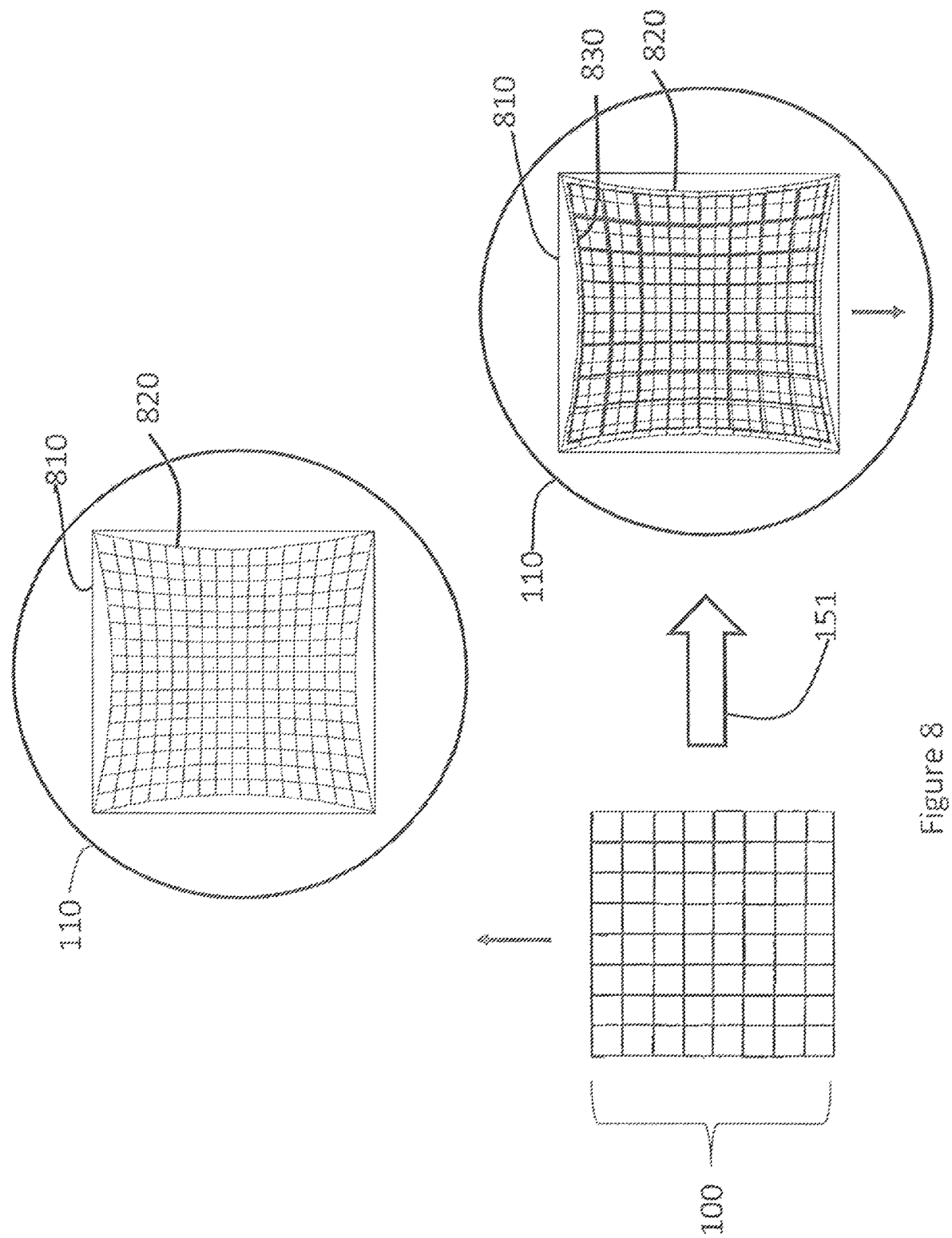

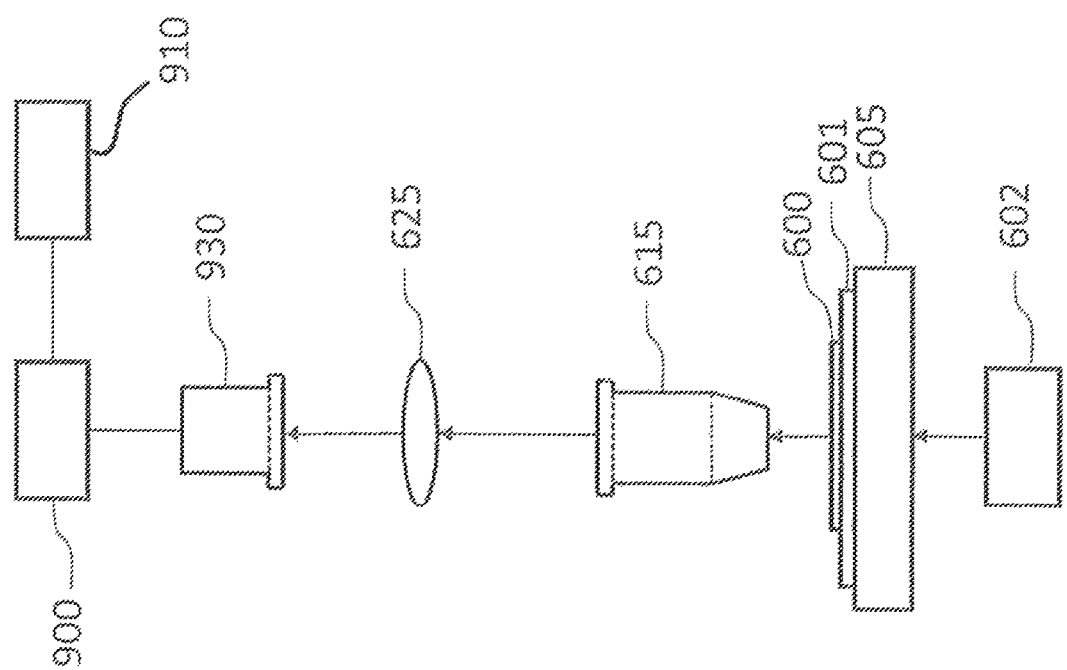

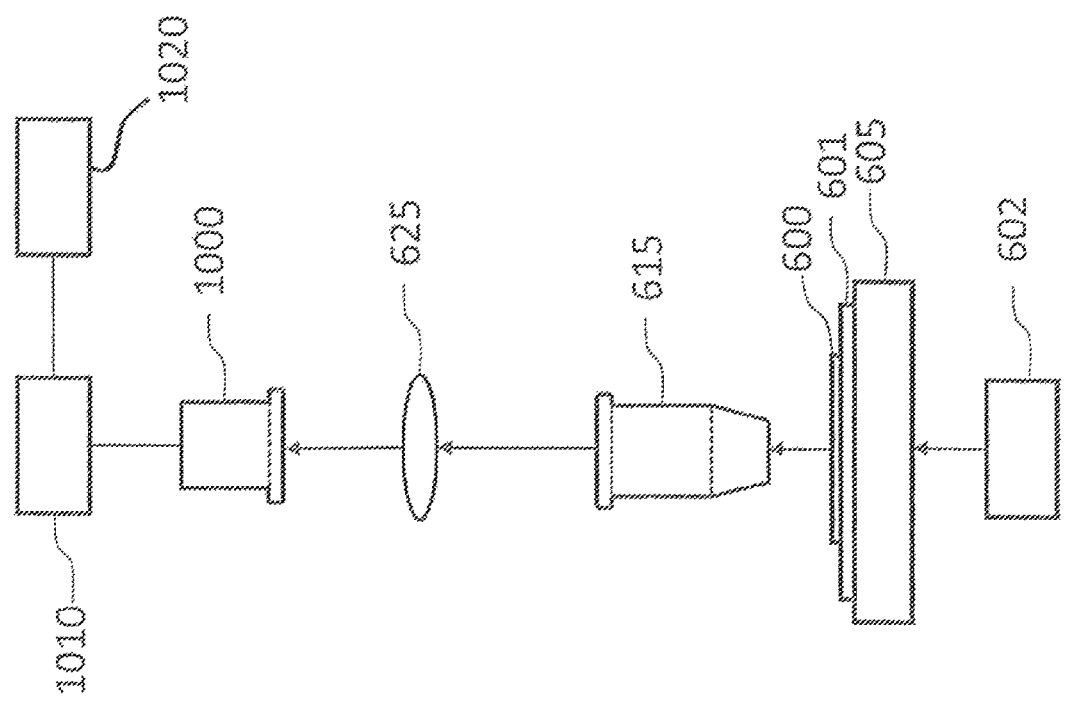

HIGH RESOLUTION PATHOLOGY SCANNER WITH IMPROVED SIGNAL TO NOISE RATIO

FIELD OF THE INVENTION

This invention relates to the fields of scanning microscope imaging of large specimens with particular emphasis on brightfield and fluorescence imaging, including photoluminscence and spectrally-resolved fluorescence. Applications include imaging tissue specimens, genetic microarrays, protein arrays, tissue arrays, cells and cell populations, biochips, arrays of biomolecules, detection of nanoparticles, photoluminscence imaging of semiconductor materials and devices, and many others.

DEFINITIONS

For the purposes of this patent document, a "macroscopic specimen" (or "large microscope specimen") is defined as one that is larger than the field of view of a compound optical microscope containing a microscope objective that has the same Numerical Aperture (NA) as that of the scanner described in this document.

For the purposes of this patent document, TDI or Time Delay and Integration is defined as the method and detectors used for scanning moving objects, usually consisting of a CCD-based detector array in which charge is transferred from one row of pixels in the detector array to the next in synchronism with the motion of the real image of the moving object. As the object moves, charge builds up and the result is charge integration just as if a longer exposure was used in a stationary imaging situation. When the image (and integrated charge) reaches the last row of the array, that line of pixels is read out. One example of such a camera is the DALSA Piranha TDI camera. CMOS TDI imagers have also been developed. CCD TDI imagers combine signal charges, while CMOS TDI imagers combine voltage signals.

For the purposes of this patent document the term "image acquisition" includes all of the steps necessary to acquire and produce the final image of the specimen, including some of but not limited to the following: the steps of preview scanning, instrument focus, predicting and setting gain for imaging each fluorophore, image adjustments including scan linearity adjustment, field flattening (compensating for fluorescence intensity variation caused by excitation intensity and detection sensitivity changes across the field of view), correction of fluorescence signal in one channel caused by overlap of fluorescence from adjacent (in wavelength) channels when two or more fluorophores are excited simultaneously, dynamic range adjustment, butting or stitching together adjacent image strips (when necessary), storing, transmitting and viewing the final image.

For the purpose of this patent document, a "frame grabber" is any electronic device that captures individual, digital still frames from an analog video signal or a digital video stream or digital camera. It is often employed as a component of a computer vision system, in which video frames are captured in digital form and then displayed, stored or transmitted in raw or compressed digital form. This definition includes direct camera connections via USB, Ethernet, IEEE 1394 ("FireWire") and other interfaces that are now practical.

Moving Specimen Image Averaging ("MSIA") is defined as the method and technology for acquiring digital strip images (image strips) across a large microscope specimen by capturing sequential overlapping frame images of a moving specimen where a new image frame is captured each time the specimen has moved a distance that causes the image of that specimen formed on a two-dimensional detector array to move a distance equal to the distance between rows of detectors in the detector array, image data from the new frame is translated (moved) in computer memory to match the motion of the image, and is added to (or averaged with) the data previously stored to generate an image of a strip across the specimen, such procedure being continued until the specimen has moved a distance such that all object points in that strip have been exposed a number of times equal to the number of active rows in the detector array. The image strip that results has increased signal-to-noise ratio because of pixel averaging, where the increased signal-to-noise ratio is equal to the square root of the number of times each pixel has been averaged to produce the final MSIA strip image.

For the purposes of this patent document, an sCMOS detector array is defined as any two-dimensional sensor array in which an active area of the array can be chosen that covers all or substantially all of the width of the array. For MSIA imaging, motion of the microscope stage is in a direction perpendicular to lines in the detector array {data is read out from lines in the detector array, where these lines of detector pixels are along the long dimension of the array (for example see Hamamatsu's ORCA-flash 4.0 camera, or PCO's pco.edge camera, both of which use Scientific CMOS (sCMOS) detector arrays)}. sCMOS detector arrays are particularly useful tor MSIA imaging since an array region of interest can be defined that includes the whole width of the array, but includes only a small number of lines of detector pixels (such lines being perpendicular to the scan directory) and the frame rate when using such an array region of interest is considerably higher than when the entire array is used. For example, when the full area of the pco.edge array (2560×2160 pixels) is used for imaging, the frame rate is 50 fps. However as an example, when an array region of interest containing 2560×36 pixels is used, the frame rate is greater than 2000 fps.

A scanning colour filter array is defined as a multi-colour filter array in which all of the pixels in several adjacent rows in the array have the same colour filter. Such arrays are not useful for stationary imaging, but when used for MSIA scanning result in high resolution colour images with no demosaicing or interpolation required.

A frame image and image frame are identical to one another and are used interchangeably throughout this patent document.

OBJECTS OF THE INVENTION

It is an object of this invention to provide an instrument and method of imaging whereby blurring of MSIA images caused by repeated averaging of data from successive detector pixels in the scan direction when an image of the specimen distorted by the microscope optics (either pincushion or barrel distortion) moves across the two-dimensional detector array can be minimized using a software-based geometric correction of each image frame. The geometric correction of each image frame depends only on the optics of the scanner, so will remain constant unless the optics is changed. One common optical change is to change microscope objectives.

It is an object of this invention to provide an instrument and method of imaging whereby sharp MSIA strip images can be acquired rapidly using a detector array containing a small number of active rows of detector pixels and a large number of column s of detector pixels, and the entire large 2D array can subsequently be used for stationary imaging of an area of interest observed in the MSIA strip images. Subsequent imaging of an area of interest that is larger than a single frame can be accomplished by acquiring several slightly-overlapping frames and stitching them together (tiling). Three-dimensional imaging of the area of interest can be accomplished by acquiring single frame images or tiled images at different focus positions.

It is an object of this invention to provide an instrument and method of imaging whereby sharp MSIA strip images can be acquired using a two dimensional detector array containing a large number of rows of detector pixels and a large number of columns of detector pixels, where software correction of optical distortion in each image frame is applied before averaging (or adding) pixel data in the MSIA process, and this large 2D array can subsequently be used for stationary imaging of an area of interest observed in the MSIA strip images. Subsequent imaging of an area of interest that is larger than a single frame can be accomplished by acquiring several slightly-overlapping frames (tiles), applying software-based distortion correction, and stitching them together. Three-dimensional imaging of the area of interest can be accomplished by acquiring single frame images or tiled images at different focus heights.

It is an object of this invention to provide an instrument and method of imaging whereby MSIA image frames can be colour corrected using software-based colour correction, resulting in colour-corrected strip images.

It is an object of this invention to provide a method of acquiring sharp MSIA images when an edge of the two-dimensional detector array is not perfectly aligned perpendicular to the scan direction.

It is an object of this invention to provide an instrument and method for high-resolution scanning using MSIA imaging in which the effects of one or more of geometric optical image distortion and detector array misalignment can be corrected by a single geometrical correction in software of each MSIA image frame before calculating a final MSIA strip image.

It is an object of this invention to provide an instrument and method for high-resolution MSIA or TDI imaging in which the effects of optical image distortion are minimized by warping the pattern of pixels in the two-dimensional detector array during fabrication to match the distortion caused by the optical train.

BRIEF DESCRIPTION OF THE DRAWINGS

FIG. 7 (top) shows a detector array that is misaligned with the scan direction inside the field of view of a microscope. FIG. 7 (bottom) shows the image of a grid-shaped specimen projected onto the misaligned array.

FIG. 8 (top) shows a detector array that has been warped to match the optical distortion of the optics in use. FIG. 8 (bottom) shows the distorted image of a specimen projected onto the warped grid of the detector array.

FIG. 9 shows a schematic view of a new scanning microscope for MSIA imaging that uses a warped detector array to correct for optical image distortion.

FIG. 10 shows a schematic view of a new scanning microscope that uses a TDI linescan detector fabricated with a warped detector array.

DESCRIPTION OF THE INVENTION

When a specimen is viewed in an ordinary microscope, geometrical distortion is small and since this distortion changes the relative position of points in the image but each image point remains in sharp focus, geometrical distortion may not be noticed unless the specimen contains a network of regular features, such as when viewing an integrated circuit. When viewing biological specimens, geometrical distortion is usually not apparent in the image, and microscope objective designed for use in biological microscopes can have pincushion distortions up to one percent. Geometrical distortion is a radial distortion caused by changes in the off-axis magnification of the image and includes both pincushion distortion and barrel distortion. The lateral magnification increases proportional to the off-axis position of an image point (pincushion distortion) or decreases proportional to the off-axis position (barrel distortion).

Figure 1A:
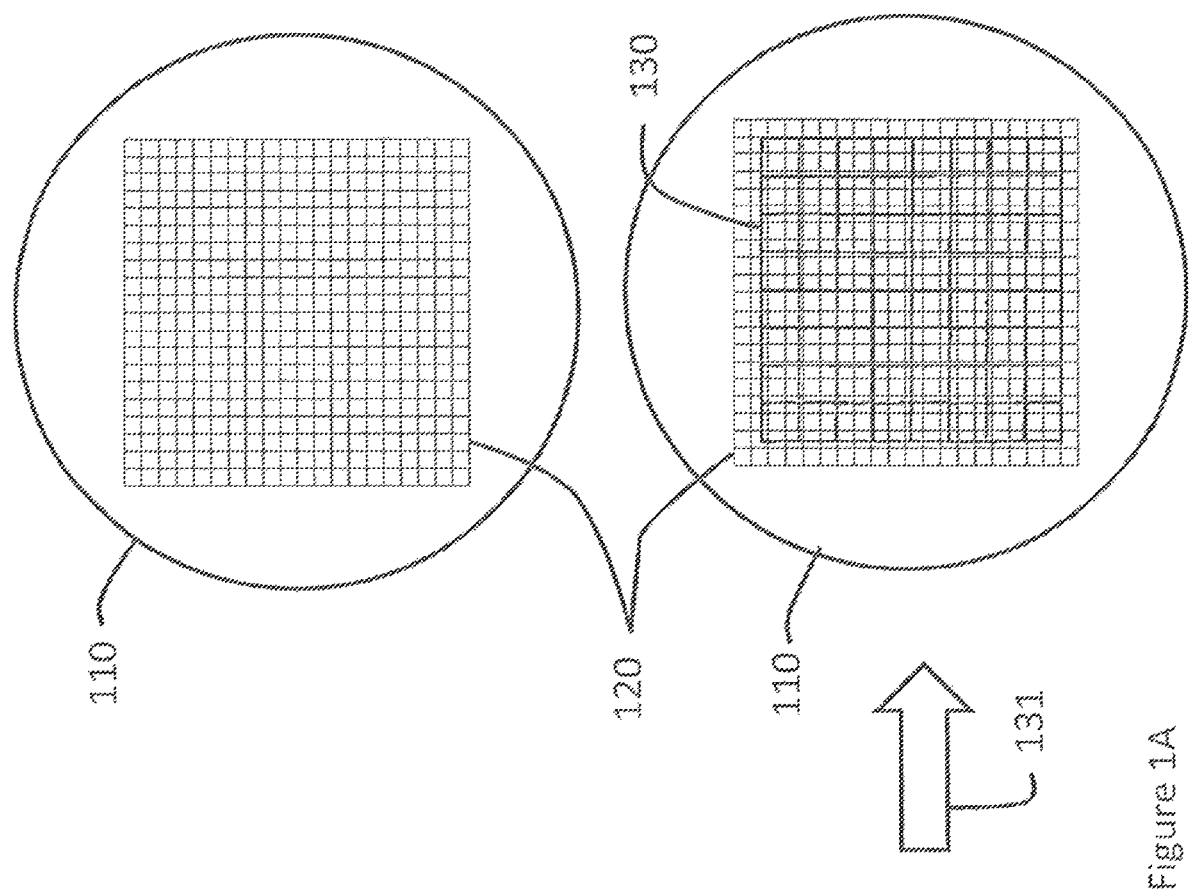
FIG. 1 is a schematic view showing a comparison of imaging a grid-shaped target using a microscope with no geometric distortion (FIG. 1A, bottom), one with barrel distortion (FIG. 1B, top), and one with pincushion distortion (FIG. 1B, bottom).
Figure 1A:
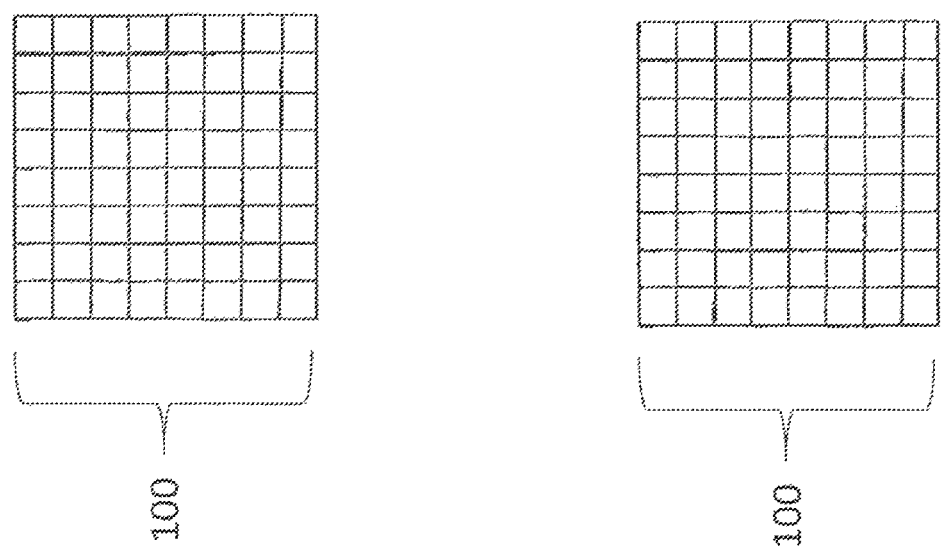
Figure 2A:
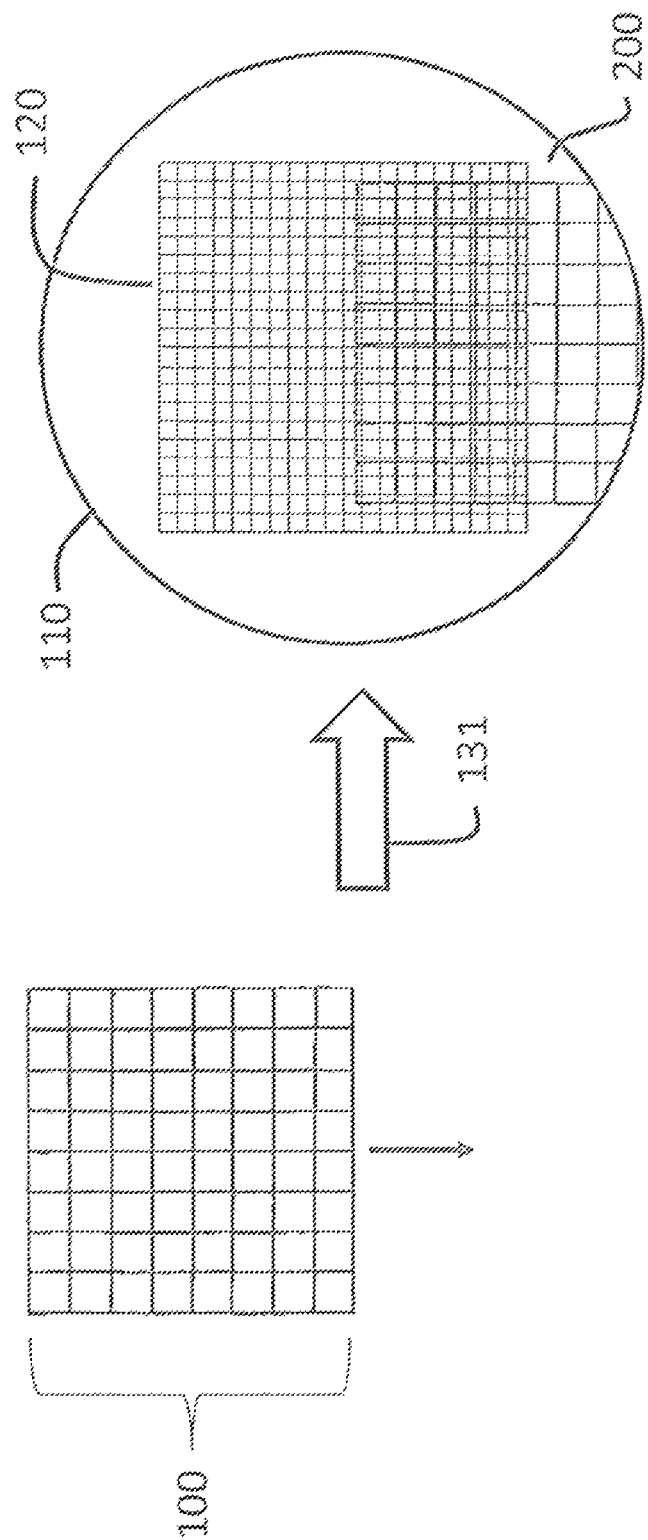
FIG. 2 shows the motion of the image of a grid-shaped target through the field of view of a scanning microscope which has no distortion.
Figure 2B:
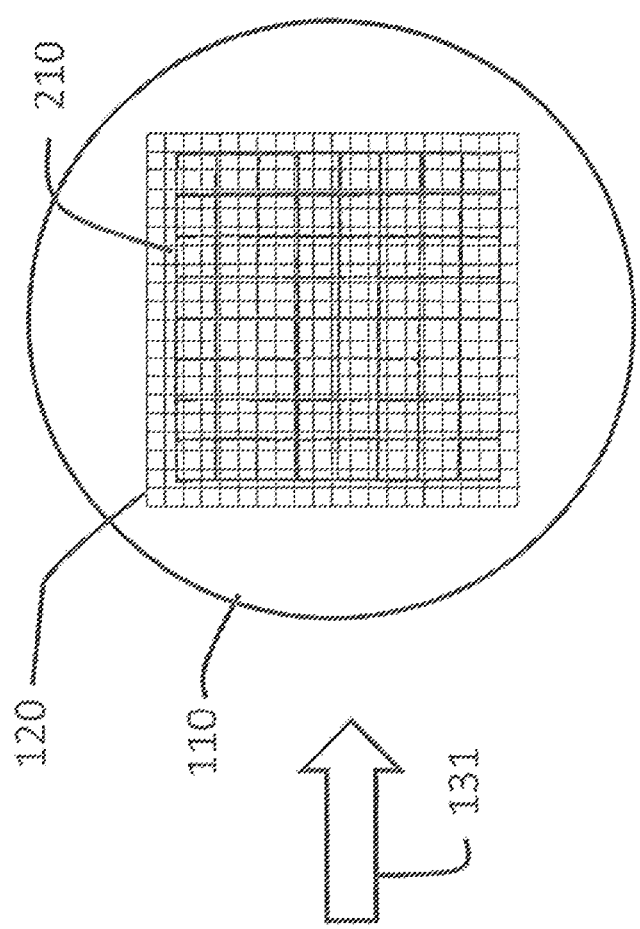
Figure 2B:
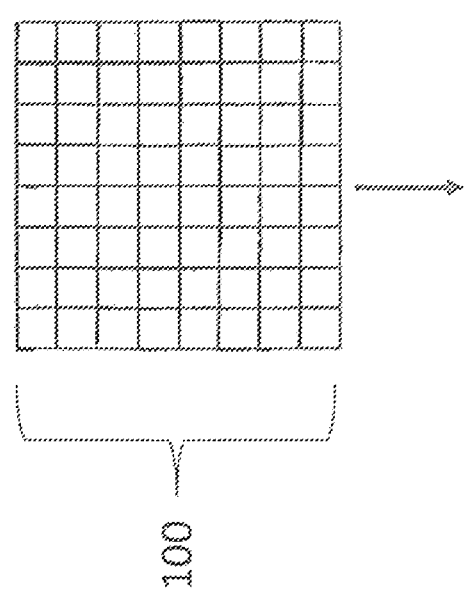
Figure 2C:
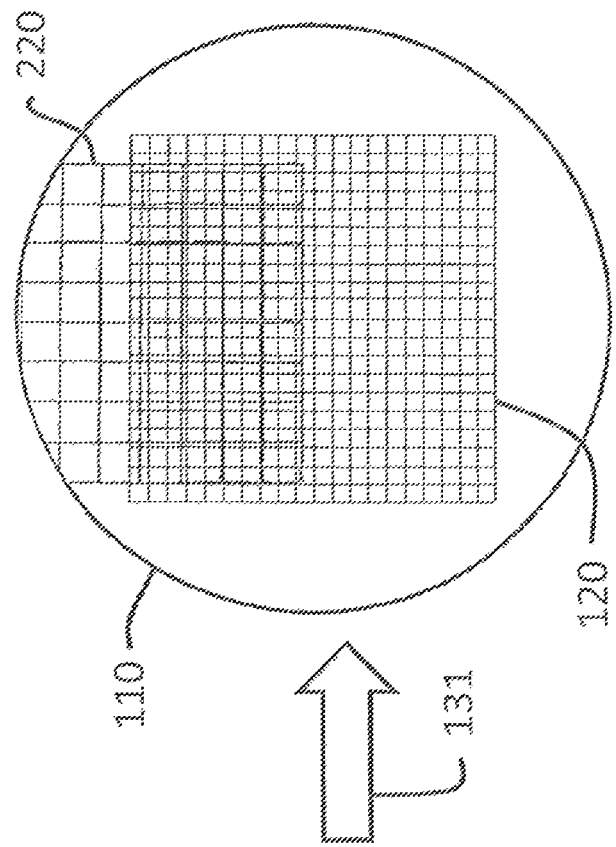
Figure 2C:
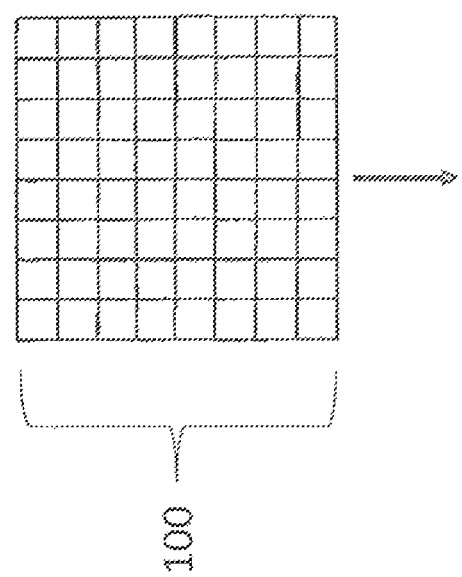

FIG. 1 shows the effect of geometric distortion in a microscope. At the top left of FIG. 1A, microscope specimen 100 is a target with a square grid pattern. On the top right, detector array 120 is shown inside the microscope field-of-view 110. The detector array 120 as shown in this example has 20 lines and 20 rows of detector pixels, or 400 pixels. In practice, much larger arrays are often used, with arrays with more than 5 Megapixels now available for use in microscopy. In FIG. 1A (bottom), the arrow 131 represents the imaging of grid-shaped specimen 100 by a microscope that has no geometric distortion, with the image 130 of microscope specimen 100 projected onto the surface of detector array 120. This example includes no geometric distortion, and the image 130 is a magnified image of specimen 100 with no distortion.

In FIG. 1B (top) arrow 141 represents imaging of specimen 100 by a microscope whose optics have barrel distortion, and in FIG. 1B (bottom), arrow 151 represents imaging of specimen 100 by a microscope whose optics have pincushion distortion. FIG. 1B (top) shows an image 140 of microscope specimen 100 when the microscope optics lateral magnification decreases proportional to the off-axis position of the image point (barrel distortion) and FIG. 1B (bottom) shows an image 150 of microscope specimen 100 when the microscope optics lateral magnification increases proportional to the off-axis position of the image point (pincushion distortion). Both of the images in FIG. 1B show geometric distortion, but they are both sharp (points on the object are imaged onto a single detector pixel).

All of the examples of geometric distortion that follow show pincushion distortion, however barrel distortion also causes blurring of the final MSIA image.

FIG. 2 shows three of the many image frames acquired during MSIA imaging when specimen 100 moves on a scanning stage under a microscope whose optics has no distortion. FIG. 2A shows an image 200 of specimen 100 at the instant when the front edge of the specimen has reached the centre position under the microscope. At that instant, the image frame captured by the detector array 120 comprises the portion of image 200 that is projected onto array 120, and the image frame captured is sharp (not blurry). In FIG. 2B, specimen 100 has moved to the centre position under the microscope, and at that instant all of image 210 of the specimen is projected onto the detector array 120, and the image frame acquired by detector array 120 at that instant in time contains the entire area of the specimen. FIG. 2C shows an instant later in time when specimen 100 has moved to a position where the trailing edge of the specimen image has reached has reached the centre position under the microscope, and at this time the frame image acquired by detector array 120 includes only the portion of the specimen image 220 that is projected onto detector array 120. As before, this image frame is sharp.

During MSIA imaging, an image frame is acquired every time the image of the specimen projected onto the detector array has moved a distance equal to the distance between rows of pixels in the array. In the example shown, detector array 120 has 20 rows of pixels, and each object point on the specimen is exposed 20 times. In order to ensure that all object points are averaged the same number of times (20 in this example), a minimum of 40 image frames are required to image the whole specimen (in practice, where an MSIA image of an entire strip across the specimen is required, using a 20×20 pixel array, thousands of image frames would be needed to compute the final MSIA strip image, but each pixel in the final image would still be exposed and averaged only 20 times). In this example, where the microscope has no geometric distortion, image points representing object points on the specimen move in straight lines along the lines of pixels in the array, and when image pixels from one image frame are added to those in the next frame, after translating the image data in the frame by a distance equal to the distance between pixels, each pixel in the final MSIA image will be the average of 20 exposures of the same object point on the specimen, and the result will be a sharp image of the specimen where every pixel has been averaged 20 times, resulting in a sharp image with increased signal/noise ratio because of the averaging.

FIG. 3 shows a series of three images that depict the imaging of specimen 300 as it moves on the scanning stage under a microscope whose optics have pincushion distortion. Specimen 300 includes dot 301 and cross 302 that are used in FIG. 3 to clarify the motion of the image of points on the specimen as the specimen moves on a moving microscope stage, resulting in motion of those image points across the surface of detector array 120.

Figure 3A:
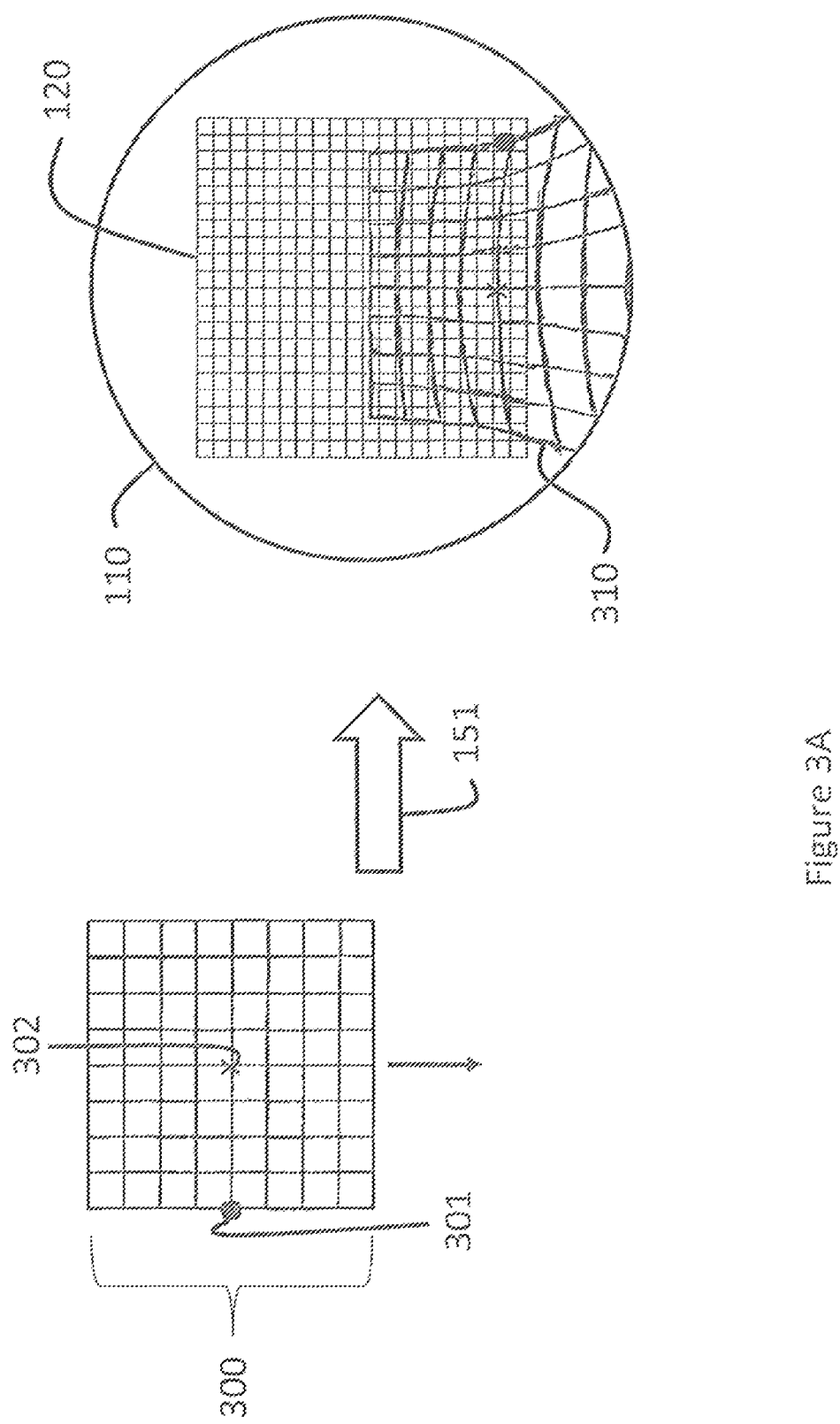
FIG. 3 shows the motion of the image of a grid-shaped target through the field of view of a scanning microscope that suffers from pincushion distortion.

FIG. 3A shows an image 310 of specimen 300 when the image of the front edge of the specimen has reached the centre of the field of view of the microscope. At that instant in time, the image frame captured by detector array 120 comprises the portion of Image 310 that is projected onto array 120. Note that the image of cross 302 is at the bottom of detector array 120 and is projected onto the second row of detector pixels at this time. The image of dot 301 is at the bottom right of detector array 120, at the corner of four detector pixels, two in the first row, and two in the second. These two images lie on a cowed line near the bottom of the detector array in the diagram.

Figure 3B:
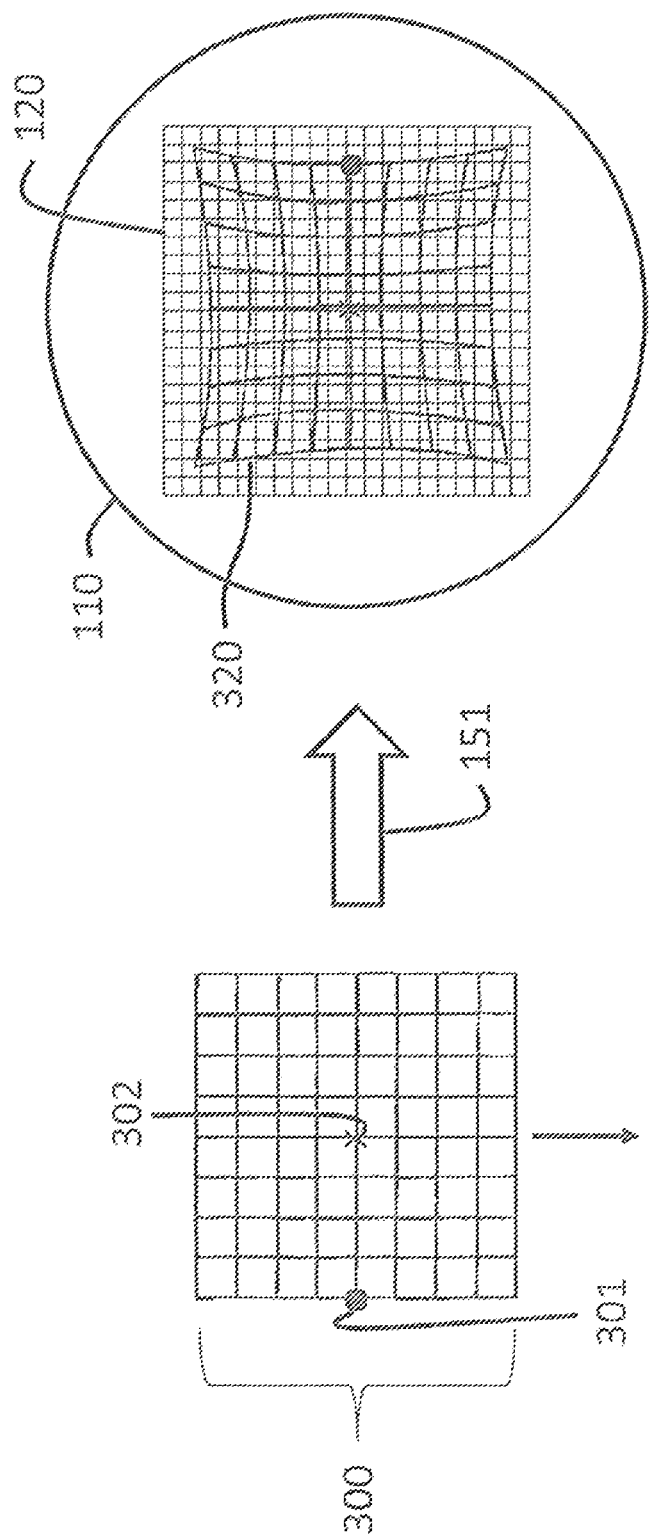

FIG. 3B shows an image 320 of specimen 300 when it has reached the centre position directly under the microscope, and the image of the specimen 300 grid is now centred on detector array 120. Both the image of dot 301 and cross 302 are protected onto the centre row of the detector array 120, and both lie on a straight horizontal line in the diagram.

Figure 3C:
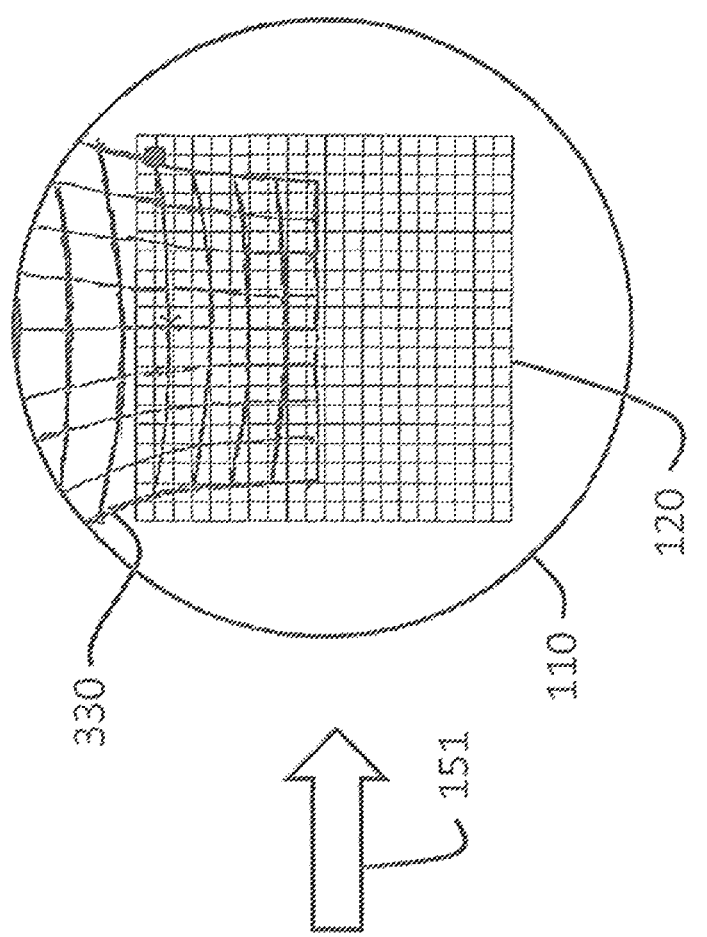
Figure 3C:
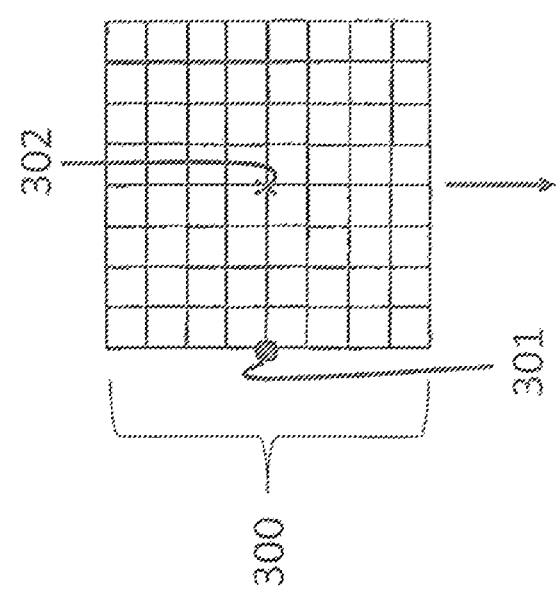

FIG. 3C shows an image 330 of specimen 300 when it has reached a position where the trailing edge of the specimen is directly under the microscope objective. Note that the image of dot 301 is now near the top right of the detector array, and the image of cross 302 has moved up a straight line along the centre of the detector array from its position in FIG. 3A. The images of dot 301 and cross 302 lie on a curved line near the top of the detector array, but the curvature of this line is opposite to the curvature of the line they were imaged on in FIG. 3A. This means that as the specimen 300 moved from its position in FIG. 3A to that in FIG. 3C, the image of dot 301 moved a larger distance across the surface of the detector array 120 than the image of cross 302 did, and along a curved path.

The three frame images (310, 320, and 330) shown in FIG. 3 are sharp images (not blurry), but when 20 successive image frames are averaged when an MSIA image is computed, the MSIA image will not be sharp because during scanning the image of an object point on the specimen does not follow exactly the grid pattern of the detector array. In the example shown in FIG. 3, during the scan 20 frame images are averaged to compute the MSIA image of the line in specimen 300 that contains dot 301 and cross 302, but the images of these two points when projected onto detector array 120 do not move along the grid lines of the array, but instead the image of dot 301 moves over four adjacent pixel positions as the scan proceeds, and the image of cross 302 moves directly up the array, but at a speed that changes during the scan, so will be averaged over two or three pixels in the vertical (towards the top of the diagram) direction. The resulting MSIA image will not be sharp, even though it results from averaging twenty sharp frame images, because the image frames suffer from geometric distortion. The amount of distortion shown in this figure is exaggerated, however even when there is much smaller distortion, in practice the detector array will contain many more pixels than is shown in the example, perhaps 2000×2000 pixels. In this case, even a small amount of distortion will cause the final MSIA image to have reduced resolution when compared to each of the image frames that were used to calculate it.

Figure 4:
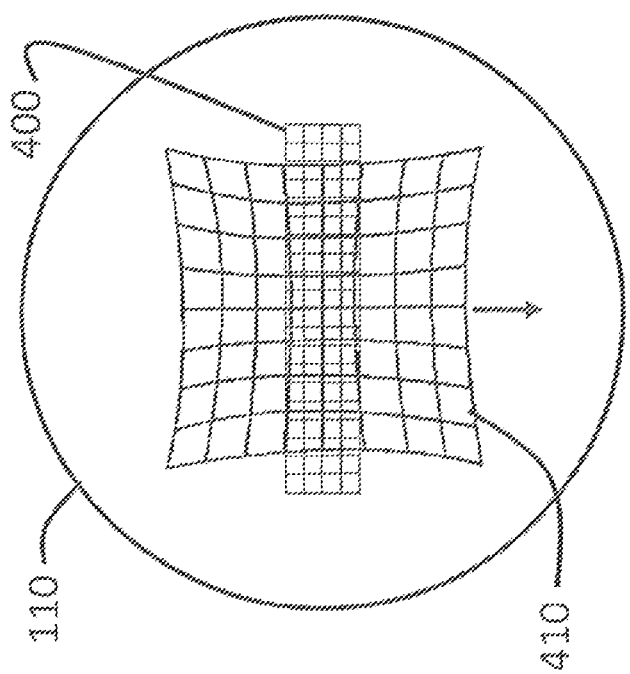
FIG. 4 shows the image of a target in the field of view of a microscope that suffers from pincushion distortion superimposed on a 4×20 pixel detector array.
Figure 4:
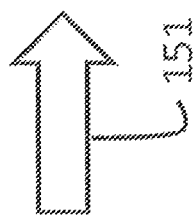
Figure 4:
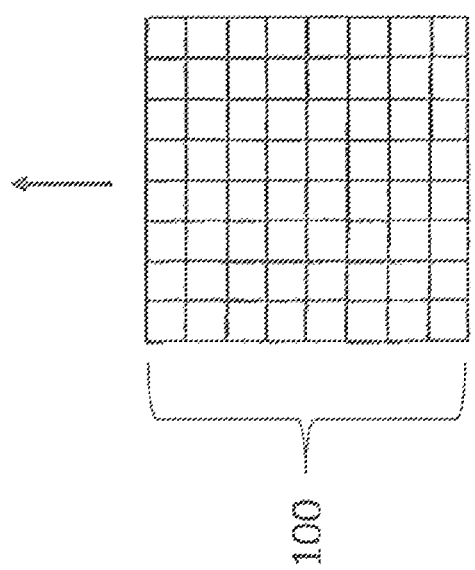

FIG. 4 represents the imaging of grid-shaped specimen 100 moving under a microscope and arrow 151 represents the optical imaging of the specimen through a microscope whose optics have pincushion distortion. The detector array 400 shown in this diagram has an aspect ratio where there are many fewer pixels in the scan direction than in the direction perpendicular to the scan direction. The example shown in this diagram has four pixels in the scan direction, but has 20 pixels in the perpendicular direction. An image 410 of microscope specimen 100 is shown inside the field of view 110 of the microscope, where only a portion of the image is projected onto the detector array 400. Note that in this case, even though the pincushion distortion has been exaggerated, the portion of the image moving across the detector array moves substantially in the vertical direction (up the diagram) and there is very little distortion in the portion of the image actually illuminating the detector array. When a detector array with a large aspect ratio is used for MSIA imaging (one example is a 16×2000 pixel array), optical distortion of the image will not cause blurring of the final MSIA image strip, however in this example (16×2000 pixel array) the signal-to-noise ratio in the image will be increased by only a factor of four.

Figure 5:
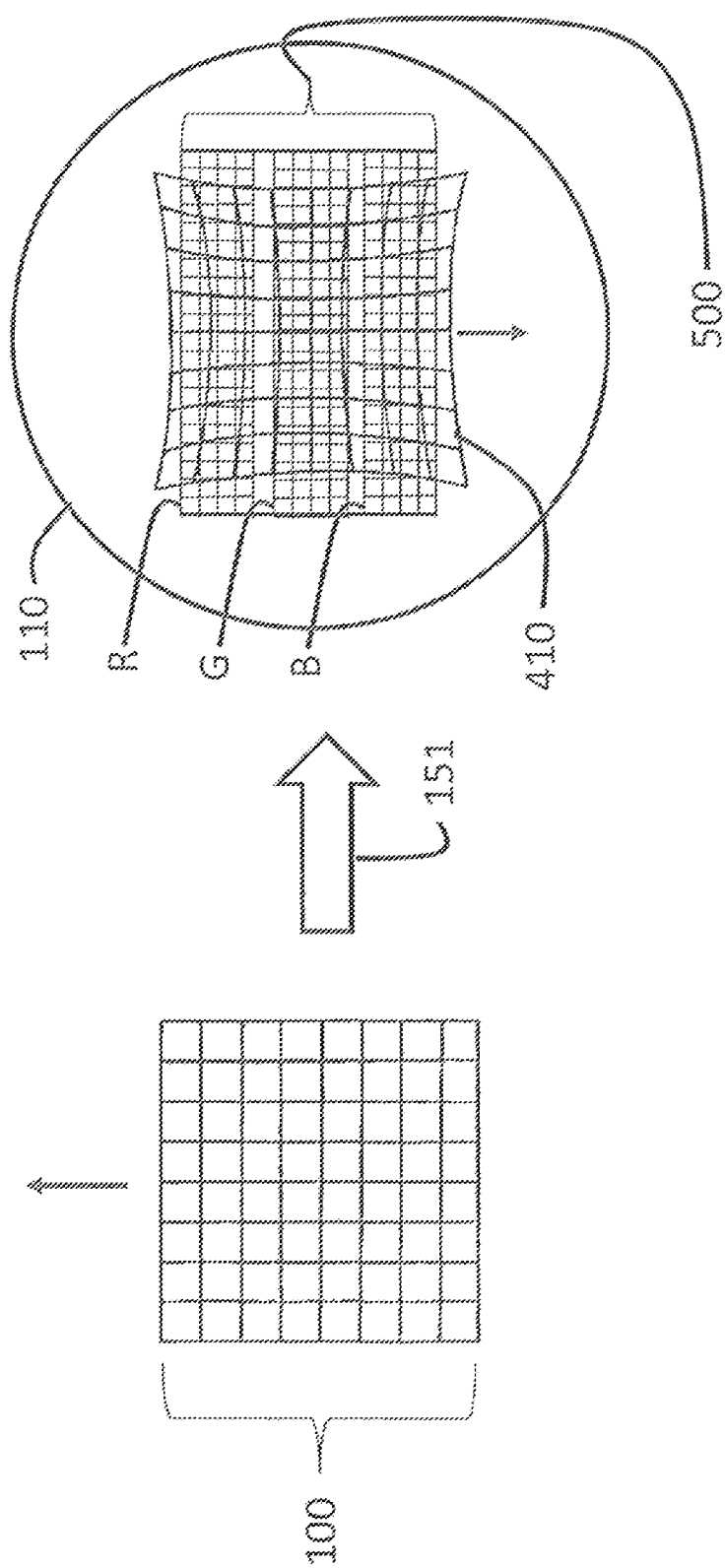
FIG. 5 represents the imaging of a square-grid-shaped specimen moving under a microscope whose optics has pincushion distortion, and imaging is accomplished using a detector array that contains an RGB scanning colour filter array.

FIG. 5 represents the imaging of grid-shaped specimen 100 moving under a microscope and arrow 151 represents the optical imaging of the specimen through a microscope whose optics have pincushion distortion. The two dimensional detector array 500 shown in this diagram incorporates an RGB scanning colour filter array where each of the colour filters covers a portion of the array that has a large aspect ratio, but the image projected onto each portion of the detector array (each colour) is affected differently by geometric distortion. When using a scanning colour filter array, data from each single-colour portion of the array is used to generate a single-colour MSIA strip image, and the three strip images are translated and registered before being combined to produce a single RGB strip image. Because the image projected onto each portion of the detector array (each colour) is affected differently by optical distortion, it is important that each RGB frame image is corrected for distortion before being incorporated into the single-colour MSIA strip images. This also applies when a Bayer Colour Filter Array (or other mosaic colour filter array) is used for MSIA imaging—the colour frame images are corrected for optical distortion in software (and the image is rotated in software to line up with the scan direction if necessary) before being incorporated into single-colour MSIA strip images.

Figure 6:
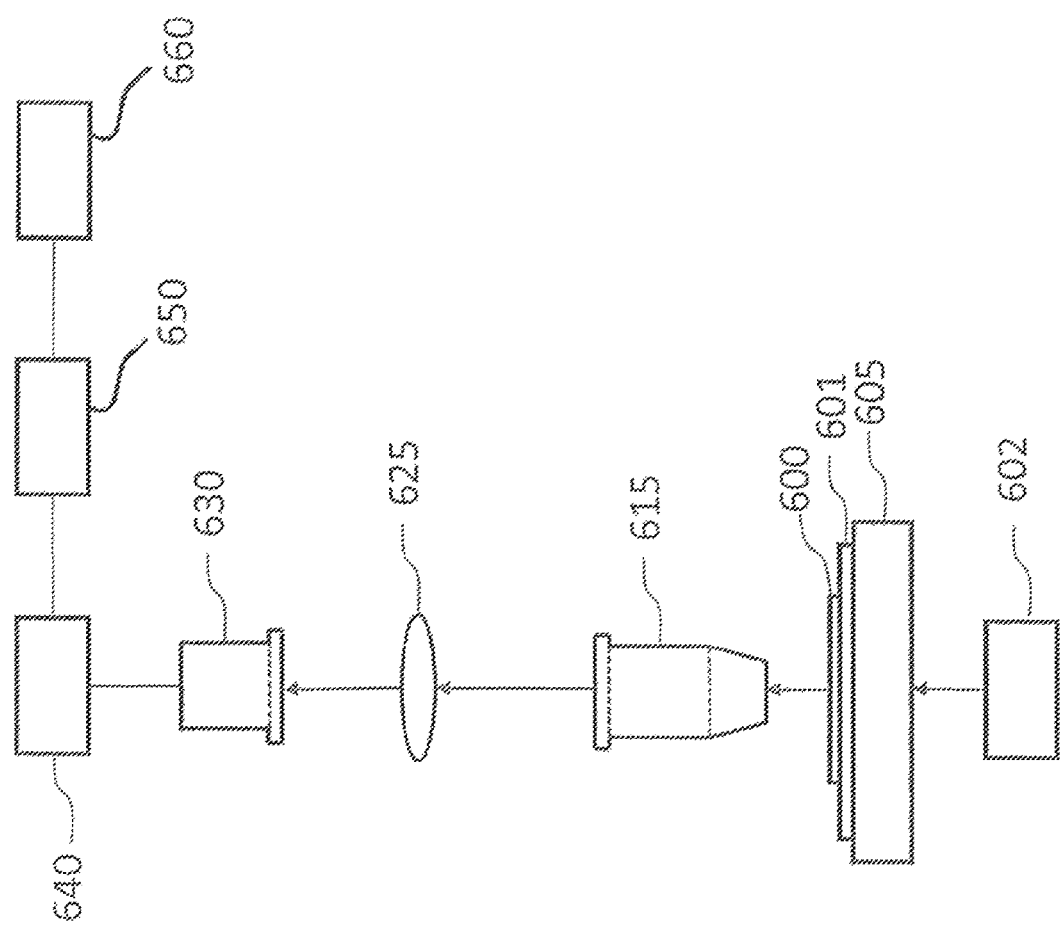
FIG. 6 is a schematic view of a new scanning microscope used for MSIA imaging that uses software-based correction of geometric distortion of each image frame.

FIG. 6 shows a schematic view of a new scanning microscope for MSIA imaging that corrects geometrical image distortion in each image frames using software before calculating an MSIA strip image. Microscope specimen 600 is mounted on a microscope slide 601 which is mounted on a scanning stage 605. For brightfield imaging, the microscope slide is illuminated from below by light source 602. Light passes through the microscope slide and specimen and passes through microscope objective 615 and tube lens 625 to form a real image on the detector array of digital camera 630. Image frame data is collected by frame grabber 640 and is passed to real-time image processor 650, where a distortion correction algorithm is applied to each frame image before it is passed to computer 660, where the image frame data is translated (moved) a distance equal to the distance between adjacent pixels in the frame image and averaged with (or added to) the image data in a growing MSIA image strip that is being simultaneously computed and stored in memory. When distortion in the frame image is corrected before averaging in the MSIA process, the resolution of the resulting MSIA image will not be reduced by distortion in the image frames. Since the distortion of each image frame is constant (depending only on the microscope optics), the same distortion correction can be applied to every image frame unless there is a change in microscope optics (for example when a different objective is used).

If the detector array of digital camera 630 is one that allows the user to define an array region of interest that becomes the active area of the array (for example, Hamamatsu's ORCA-flash 4.0 camera, or PCO's pco.edge camera, both of which use Scientific CMOS (sCMOS) detector arrays), this results in a particularly useful MSIA scanner. In an sCMOS detector array, an array region of interest can be chosen that includes the whole width of the array, and the frame rate when using such an array region of interest is considerably higher than when the entire array is used. For example, when the full area of the pco.edge array (2560×2160 pixels) is used for imaging, the frame rate is 50 fps (frames per second). However, as an example, when an array region of interest containing 2560×36 pixels is used, the frame rate is greater than 2000 fps.

When increased signal-to-noise in the image is very important (for example when a scanner is used for imaging a weak fluorescent specimen {which requires a different illumination system than that shown in FIG. 6}), an active array region of interest can be chosen that includes a large number of rows of pixels across the entire width of the array (or even the entire area of the array) in order to increase the number of frame images averaged and thus maximize the signal-to-noise ratio in the final MSIA image. In this case, the camera frame rate will be low (50 fps when the entire area of the array is used in the example above) and distortion correction will be required for each image frame, so scan time will increase, but the signal-to-noise ratio of the final MSIA image will be maximized, and MSIA image resolution will not be reduced by geometric distortion in the microscope optics.

When imaging speed is very important, and signal strength is high (as is often the case when imaging in brightfield), a smaller array region-of-interest can be chosen (while keeping the width of the region-of-interest equal to the whole width of the array). In this case, the frame rate of the camera is increased dramatically (up to 2000 fps in the example above), and because the aspect ratio of the active area of the array is large, optical distortion is not as important when calculating the MSIA image strip. In this situation, it may not be necessary to perform the optical distortion correction calculation, so scan speed can be increased dramatically. After the image has been scanned at high speed using a small active array region-of-interest, a particular area of interest in the MSIA image can be imaged using the entire array for stationary imaging, or as a tiling imagers using several adjacent tiles that can be stitched together. When used for tiling, the software optical distortion correction makes it very easy to stitch together adjacent tiles. Additional stationary images can be acquired at different focus depths, resulting in a 3D image of the specimen. This use of high-speed imaging for MSIA image acquisition followed by stationary imaging of a region of interest in the specimen and 3D imaging of that region of interest is of particular interest for imaging thick tissue specimens.

Frame grabber 640, real-time image processor 650 and computer 660 are shown as three separate entities in FIG. 6. In practice, all of these functions may be contained in the computer.

In addition to geometric distortion, the MSIA image will also have decreased resolution if the detector array is not perfectly aligned with the scan direction. FIG. 7 (top) shows a 20×20 pixel detector array inside the field of view 110 of a microscope, in which the array 720 is misaligned with the scan direction (shown by an arrow above grid-shaped specimen 100). FIG. 7 (bottom) shows specimen 100 moving on the moving stage, while arrow 131 represents the imaging of grid specimen 100 by a microscope that has no geometric distortion, with the image 130 of microscope specimen 100 projected onto the surface of misaligned detector array 720. The image 130 is a magnified image of specimen 100 with no distortion. In this simple example, where the detector array has only 20×20 pixels, the resulting MSIA image will have its resolution reduced by approximately a factor of two when the misalignment causes the image of a point on the specimen to move during scanning to an incorrect position on the detector array when that point has been imaged 20 times where that incorrect position is a distance from the correct position equal to the distance between pixels on the detector array. For example, during scanning, the bottom left corner of image 130 will first be detected by the top left pixel in the detector array, and after 20 exposures will be detected by the pixel that is in the second column of the bottom row of the detector array instead of the pixel on the bottom left of the detector array, which would have detected this corner if there were no misalignment between the scan direction and the detector array.

For example, when using the entire area of the sCMOS detector array described earlier (2500×2160) as an active area, when the array is misaligned such that during averaging to calculate the MSIA image the last row of pixels is one pixel to the left or right of the first row of pixels{a misalignment of $\tan^{-1}$ (1/2160)=0.027 degrees in this example}, then each pixel in the final MSIA image will be averaged over an area of the specimen that is two pixels wide, and the resulting image pixels in the MSIA image strip will be blurred to two pixels in width in the direction perpendicular to the scan direction. In practice, if the misalignment between the first and last rows is less than 1/10 of a pixel, there is no noticeable blurring of pixels in the final image. This requires that misalignment of the detector array with the scan direction is less than 0.0027 degrees. Misalignment can be corrected by careful alignment of the detector array with the scan direction, or can be corrected in software by rotating each image frame to align it with the scan direction before the image data in the frame is used to calculate an MSIA image strip. This image rotation (if required) can be combined with the distortion correction described earlier into a single step.

When an active array region-of-interest is defined to include a smaller number of rows, for example 2560×36, alignment between the detector and the scan direction is not nearly as critical. In this case, assuming alignment better than 1/10 of a pixel, the array must be aligned with the scan direction to 0.159 degrees or less.

Finally, if required, a software correction for lateral colour can also be applied to the image frame. All three corrections must be applied to each image frame before constructing the final MSIA image strip.

Note that although the effects of geometric distortion in the microscope optics can be minimized in MSIA scanning by performing a distortion correction on each frame image before image averaging, the same thing is not true for scanners using TDI detectors, where it is not possible to access the individual image frames. It is also not possible to correct image blur due to misalignment of a TDI detector by using image rotation in software.

Geometrical optical image distortion (pincushion distortion or barrel distortion) can also be corrected in digital imaging by warping the grid on which detector pixels are positioned when the detector array is fabricated. FIG. 8 (top) shows a 16×16 pixel detector array 810 in which the grid 820 on which detector pixels are located has been warped to match the optical distortion of the optics in use. In the diagram, a detector pixel is placed at the centre of each square (or warped square) in the detector grid. The shape of these pixels does not have to change to match the local shape of the grid. FIG. 8 (bottom) shows specimen 100 moving on the moving stage, while arrow 151 represents the imaging of grid-shaped specimen 100 by a microscope that has pincushion distortion, with the image 830 of microscope specimen 100 projected onto the surface of detector array 810, where the grid 820 defining the position of detector pixels in detector array 810 has been warped to match the optical distortion of the optics that projects image 830 onto detector array 810. The image 830 is a magnified image of specimen 100 with pincushion distortion, and is projected onto detector array 810 where the grid of detector pixel positions has been warped to match the distortion in the projected image. The image data is transferred from detector array 810 to the computer and stored as a square grid of pixel data, thus completely eliminating optical distortion in the frame image caused by the microscope optics.

Note that in this case, since the distortion built into the detector array must match the distortion produced by the optics, a different detector array is necessary if the magnification is changed by changing the microscope objective, or even if the objective is changed to an objective with the same magnification but different optical design.

Because the use of a detector array that is warped to match the optical distortion of the microscope results in digital image frames that have no geometric distortion, this arrangement also works well for tiling systems since undistorted image frames can be stitched together easily.

Also note that warping of the detector array grid to reduce optical distortion works with all 2D detector arrays (CMOS, CCD, sCMOS or other technologies) and also works with TDI arrays since a TDI array with a warped array grid minimizes the effect of optical distortion without requiring access to the frame image data.

FIG. 9 shows a schematic view of a new scanning microscope for MSIA imaging that uses a warped detector array to correct for optical image distortion before calculating an MSIA strip image. Microscope specimen 600 is mounted on a microscope slide 601 which is mounted on a scanning stage 605. For brightfield imaging, the microscope slide is illuminated from below by light source 602. Light passes through the microscope slide and specimen and passes through microscope objective 615 and tube lens 625 to form a real image on the detector array of digital camera 930. The detector array of digital camera 930 has been warped during manufacture to match the optical distortion produced by the microscope optics, comprised of microscope objective 615 and tube lens 625. Image frame data is collected by frame grabber 900 and is passed to computer 910, where the image frame data is translated (moved) a distance equal to the distance between adjacent pixels in the frame image and averaged with (or added to) the image data in a growing MSIA image strip that is being simultaneously computed and stored in memory. When distortion in the frame image is corrected before averaging in the MSIA process (here distortion is corrected using a detector in which the position of detector pixels has been changed to match the optical distortion of the image projected onto the detector), the resolution of the resulting MSIA image will not be reduced as it is when distorted image frames are translated and averaged in the MSIA process.

Frame grabber 900 and computer 910 are shown as separate entities in FIG. 9. In practice, these functions may be contained in the computer.

When TDI detectors are used as linescan cameras in scanners with lenses that produce images with optical geometric distortion (pincushion distortion or barrel distortion), the effect of such distortion (reduced resolution (blurring) of the output line image ) is presently limited by using TDI detectors with only a small number of rows of detector pixels (for example, a 2000×24 pixel array, instead of using a 2000×2000 pixel array, which would result in a much larger signal/noise ration, but blurry line images). FIG. 10 shows a schematic view of a new scanning microscope that uses a TDI linescan detector fabricated with a detector array in which the number of rows of detector pixels is substantially as large as the number of lines of detector pixels, where the detector array is warped during fabrication to match the optical distortion of the microscope, resulting in sharp output line images that can be assembled in the scan direction into image strips, with much increased Signal/Noise ratio and high resolution.

In FIG. 10, Microscope specimen 600 is mounted on a microscope slide 601 which is mounted on a scanning stage 605. For brightfield imaging, the microscope slide is illuminated from below by light source 602. Light passes through the microscope slide and specimen and passes through microscope objective 615 and tube lens 625 to form a real image on the TDI linescan detector array of digital camera 1000. The TDI detector array of digital camera 1000 has been warped during manufacture to match the optical distortion produced by the microscope optics, comprised of microscope objective 615 and tube lens 625. During scanning, line image data is collected by frame grabber 1010 and is passed to computer 1020, where the line images are assembled one by one in the scan direction to produce a 2D strip image. Because optical image distortion has been removed by warping the TDI's detector array, the result is high resolution image strips with improved S/N.

Frame grabber 1010 and computer 1020 are shown as separate entities in FIG. 10. In practice, these functions may be contained inside the computer.

I claim:

1. An instrument for imaging at least a portion of a specimen, the instrument comprising:
    a) an illumination system to illuminate a part of the specimen scanned;
    b) at least one lens to focus light from the specimen onto a two dimensional sensor array, the specimen mounted on a support that is movable relative to the two dimensional sensor array;
    c) the instrument controlled by a computer to capture sequential substantially overlapping frame images of the specimen each time that the image of the specimen has moved a distance relative to the two dimensional sensor array that is equal to the distance between adjacent rows of the sensor array, image data from each new frame image translated in computer memory to match a motion of an optical image across the detector array and added to or averaged with any data previously stored to generate an image of the strip across the specimen, the capturing of frame images continuing until the specimen has moved a relative distance where all object points in that strip have been exposed a number of times equal to a chosen number of active rows in the sensor array; and
    d) the instrument controlled by a computer to use an active area of the two dimensional sensor array that covers substantially all of a width of the sensor array but is less than a length of the sensor array to create the one or more strip images of the portion of the specimen scanned, the one or more strip images created from the multiple image frames as each of the multiple image frames is captured:
    wherein the instrument is configured to remove distortion from each of the multiple image frames captured prior to adding or averaging each of the multiple image frames in the image strip;
    and wherein the instrument is configured to correct any blurring of the strip image caused by the two dimensional sensor array being misaligned with a scan direction to rotate data for each image frame to align it with the scan direction before data from each of the image frames is used to calculate the one or more image strips.

2. The instrument as claimed in claim 1 wherein the instrument is configured to acquire still images of a region of interest of the specimen using the entire two dimensional sensor array in addition to the moving specimen image average (MSIA) acquired images.

3. The instrument as claimed in claim 1 in which the multiple image frames are in color and the instrument is configured to color correct the multiple frames prior to adding or averaging.

4. The instrument as claimed in claim 1 wherein the entire two dimensional array is used to obtain the multiple image frames.

5. The instrument as claimed in claim 1 wherein the instrument is configured to use a small number of active rows and a large number of active columns of the detector array.

6. The instrument as claimed in claim 1 wherein the two dimensional sensor array contains a large number of rows of detector pixels and a large number of columns of detector pixels and the instrument is configured by adding data for each of the multiple image frames as the frames are captured to create one or more image strips when the dynamic range of the strip image is larger than that of the image frames.

7. The instrument as claimed in claim 1 wherein the instrument is configured to average data for each of the image frames with previously captured image frames as the image frames are captured when the dynamic range of the strip image is the same as that of the image frames.

8. The instrument as claimed in claim 1 wherein the effects of Optical Image Distortion are minimized by warping a pattern of pixels in the two dimensional sensor array during fabrication to match the distortion caused by an optical train of the instrument.

9. The instrument as claimed in claim 1 wherein the instrument is configured to correct any blurring in the one or more image strips by warping a grid of the two dimensional sensor array on which detector pixels are positioned when the sensor array is fabricated to match any geometric optical distortion of the instrument.

10. The instrument as claimed in claim 1 wherein there is a color filter array on the two dimensional detector array between the detector array and the specimen.

11. The instrument as claimed in claim 10 wherein the color filter array is one of:
    a) a scanning color filter array with several rows, each row being of one color and adjacent rows having a different color, there are at least six rows of red, green and blue (RGB), a pattern of the RGB rows is repeated at least once; or
    b) a scanning color filter array with several rows, each row being of one and adjacent rows having a different color, there are at least eight rows of red, green, blue and white (RGBVV), a pattern of the RGBW rows is repeated at least once; or
    c) a scanning color filter array wherein one third of the scanning color, filter array is comprised of a red transmission filter, another one third of the scanning color filter array is comprised of a green transmission filter and a remaining one third of the scanning color filter array is comprised of a blue transmission filter;
    d) a scanning color filter array wherein one quarter of the scanning color filter array is comprised of a red transmission filter, another one quarter of the scanning color filter array is comprised of a green transmission filter, another one quarter of the scanning color filter array is comprised of a blue transmission filter and a remaining one quarter of the scanning color filter array is comprised of a white transmission filter; or e) a Bayer color filter.

12. A method of scanning at least a portion of a specimen using the method comprising:

a) controlling the instrument by computer to capture sequential substantially overlapping frame images of the specimen each time that the image of the specimen has been moved a distance relative to the two dimensional sensor array that is equal to the distance between adjacent rows of the two dimensional sensor array, translating in computer memory image data from each new frame image to match a motion of an optical stage across the two dimensional sensor array and adding to or averaging the image data from each new frame image with any data previously stored to create an image strip; and b) controlling the instrument by a computer to use an active area of the two dimensional sensor array that covers substantially all of the width of the sensor array but less than the length of the sensor array to create the image strip of the specimen being scanned; and c) continuing the capturing of frame images until the specimen has moved a relative distance where all object points in that strip have been exposed a number of times equal to a chosen number of active roles in the two dimensional sensor array.

13. The method as claimed in claim 12 including the steps of configuring the instrument to remove any distortion from each of the multiple image frames captured prior to adding or averaging each of the multiple image frames to create the image strip.

* * * * *